United States Patent [19]

Schilling et al.

[11] Patent Number: 4,676,927

[45] Date of Patent: Jun. 30, 1987

[54] RAPID AND MEDIUM SETTING HIGH FLOAT BITUMINOUS EMULSIONS

[75] Inventors: Peter Schilling; Hans G. Schreuders, both of Charleston, S.C.

[73] Assignee: Westvaco Corporation, New York, N.Y.

[21] Appl. No.: 783,691

[22] Filed: Oct. 3, 1985

[51] Int. Cl.$^4$ .................... B01J 13/00; C08L 95/00
[52] U.S. Cl. .................... 252/311.5; 252/312; 252/358; 106/277
[58] Field of Search .............. 252/311.5, 312, 8.5 C, 252/358; 106/277

[56] References Cited

U.S. PATENT DOCUMENTS

| | | | |
|---|---|---|---|
| 4,008,096 | 2/1977 | Knapp | 106/277 |
| 4,293,459 | 10/1981 | Detroil | 252/311.5 X |
| 4,370,170 | 1/1983 | Tolonen et al. | 252/311.5 X |
| 4,433,084 | 2/1984 | Ostermeyer | 252/311.5 X |
| 4,455,149 | 6/1984 | Satake et al. | 252/312 X |
| 4,512,806 | 4/1985 | Graham | 252/311.5 X |
| 4,561,901 | 12/1985 | Schilling | 252/311.5 X |

*Primary Examiner*—John F. Terapane
*Assistant Examiner*—Catherine S. Kilby
*Attorney, Agent, or Firm*—Terry B. McDaniel; Richard L. Schmalz

[57] ABSTRACT

Alkaline solutions of combinations of tall oil fatty acids or tallow fatty acids and their reaction products with acrylic acid, fumaric acid and maleic anhydride with and without catalytical amounts of iodine at a dosage of 0.4–0.6% based on the weight of asphalt emulsions are disclosed to be efficient emulsifiers for rapid set high float emulsions. Blends of fatty acids with fumarized or maleinized rosin are also excellent emulsifiers. If dosage levels of above 0.6 to 3.0% are used, medium set high float emulsions are obtained. Combinations of tall oil fatty acid and sulfonated tall oil fatty acid also give medium set high float emulsions.

20 Claims, No Drawings

4,676,927

RAPID AND MEDIUM SETTING HIGH FLOAT BITUMINOUS EMULSIONS

BACKGROUND OF THE INVENTION (1) Field of the Invention

This invention relates to paving compositions consisting of a mixture of aggregate and bituminous emulsions. Generally, there are two ways to produce such a mixture which, after application onto a worn out road surface, results in a strong matrix suitable to bear heavy traffic. One way to produce an aggregate asphalt emulsion mix is to apply emulsion onto the road surface to be repaired and spread aggregate on top. The stones, which make up the aggregate, sink into the emulsion; and upon setting of the emulsion, which is the result of evaporation of the water from the emulsion, the stones are locked into place; and a strong matrix is obtained. Emulsions used for this type of application are generally referred to as rapid setting emulsions. The main specification for anionic rapid setting emulsions according to ASTM-D977 is a minimum demulsibility of 60% when treated with a 0.02N $CaCl_2$ solution. The second method to achieve an aggregate-emulsion mix is by mixing the required amount of aggregate and asphalt emulsion at a separate location in a central mixing plant. These mixes are hauled to the locations where they are applied. One important feature of the asphalt emulsions to be suitable for this technique is the ability to produce a mix which still can be handled after transport to the location of application. The most suitable way to do this is to use cutback asphalt from the emulsion. Cutback asphalt is generally referred to as a blend of fuel oil or other petroleum distillates and asphalt. The content of oil may be in the range of 1–15% based on asphalt. The advantage of using cutback asphalt for these mixes is the fact that even when the emulsion in the mix breaks prematurely, the viscosity of the asphalt is still low enough that the mix can be handled. Emulsions used for this type of application are referred to as medium setting emulsions. According to ASTM-D977, they are distinguished from rapid setting emulsions in that no minimum demulsibility is required.

Both cationic and anionic emulsions are applied in the field. They distinguish themselves by the type of the emulsifier which is used for the preparation and especially by the pH value of the emulsions. Cationic emulsions are generally prepared at pH values between 1.5 and 7.0. Nitrogen containing chemicals, such as fatty amines, fatty diamines, and fatty amidoamines, fatty quaternary-amonium salts or aminolignins, are used as emulsifiers. Anionic emulsions are prepared at pH values ranging from 7 to 12. Fatty acids or fatty sulfonic acids, which upon treatment with alkali, such as sodium hydroxide or potassium hydroxide, form anionic soaps, are the most effective emulsifiers.

One feature of bituminous pavements regarded as objectionable is their tendency to soften in hot weather resulting in shoving, rutting or bleeding (migration of the binder to the surface) of the matrix. Hard asphalts are not softened at increased temperatures; but they are hard to emulsify and show objectionable properties at low temperatures, such as premature cracking.

(2) Description of the Prior Art

By employing a suitable emulsifier system for the preparation of the asphalt emulsion, soft asphalts can be modified in a way that after the emulsion has set, the asphalt will be modified so that the temperature range where it possesses decreased flow is extended. Low temperature susceptibility is also improved by maintaining its ductile properties in cold weather (less brittle at low temperature). In general terms, by this modification of the asphalt, the deformation of the road surface in hot weather is prevented, resulting in loss of aggregate from the surface. Emulsifiers, where the hardness at higher temperatures of the asphalt is increased and the hardness at lower temperatures is not adversely affected, are disclosed by K. E. McConnaughay in U.S. Pat. No. 2,855,319. The most effective emulsifying agent is tall oil soap, obtained as the by-product of the kraft pulping process whereby chipped pinewood is digested with sodium hydroxide and sodium sulfide. If crude tall oil is employed to prepare the emulsion, generally 2% to 4% based on the weight of asphalt is sufficient to obtain high float emulsions. Both increased melting point and resistance to flow at elevated temperature are measured by the "float test." In this test (ASTM-D139) a plug of "emulsion residue" is solidified in a brass collar by an aluminum float which is placed into a water bath heated to 140° F. The time required for the water to break through the plug is determined. The asphalt emulsion residue forms the high float test when the collar floats for at least 1,200 seconds. The "residues" of the emulsion typically are considered to be what remains from an asphalt emulsion after the water is evaporated. The significance attached to the high float property is that the residue from a high float emulsion will not flow under the force of gravity at temperatures as high as 140° F. As a result of the high amounts of tall oil soap emulsifier, these high float emulsions show the characteristics of medium setting emulsions since the demulsibility with calcium chloride solution is less than 60% (in most cases less than 20%), which minimum value is specified for rapid setting emulsions (ASTM-D977). "Rapid setting" emulsions are useful for seal coats, surface treatments, penetration treatment of macadam, etc. The preparation of rapid setting high float emulsions is disclosed by L. F. Ostermeyer et al. in U.S. Pat. No. 4,433,084. In one embodiment of the Ostermeyer et al. process, asphalt cement is mixed with tall oil or tall oil derivatives, such as tall oil pitch or black liquor soap skimmings, at levels of 1–5% based on the weight of the blend prior to emulsification. The blend is then emulsified with accepted techniques to provide a rapid setting emulsion. According to a second embodiment, tall oil pitch or derivatives (such as tall oil heads, tall oil fatty acid, or rosin) are reacted with strong base, such as sodium hydroxide or potassium hydroxide, to form a suitable modifier which is added to the asphalt cement prior to emulsification at a dosage of 0.4–10% based on the weight of the asphalt. In a third embodiment, an alkaline soap of tall oil pitch (or derivative) is formed and added to the asphalt cement prior to emulsification. Rapid setting high float emulsions are also known to be obtained by incorporating 1–5% of a styrene-butadiene-styrene block copolymer or styrene-isoprene-styrene block copolymer into the asphalt cement prior to emulsification.

SUMMARY OF THE INVENTION

It has been found that alkaline solutions of combinations of from 20% to 80% tall oil fatty acids or tallow fatty acids and from 20% to 80% of their reaction products with acrylic acid, fumaric acid, and maleic anhydride, prepared both with and without catalytical amounts of iodine, are efficient emulsifiers for rapid set high float asphalt emulsions at a dosage of 0.4–0.6% based on the weight of the emulsions. Similarly proportioned blends of fatty acids with fumarized or maleinized rosin are also excellent emulsifiers. If emulsifier dosage levels of from above 0.6 to 3.0% are used, medium set high float emulsions are obtained. Combinations of tall oil fatty acid and sulfonated tall oil fatty acid give medium set high float emulsions.

DESCRIPTION OF THE PREFERRED EMBODIMENTS

The chemical structure of the reaction products of crude tall oil, tall oil fatty acids, tallow fatty acids or generally $C_{10}$–$C_{18}$ unsaturated fatty acids or rosin derived resin acids with acrylic acid, fumaric acid or maleic anhydride depends on the use of catalytical amounts of iodine for the reaction. The reaction products are mixtures of $C_{18}$-monocarboxylic and $C_{21}$-dicarboxylic acids and $C_{22}$-tricarboxylic acids or anhydrides. The reaction products of resin acids with the same reagents are mixtures of $C_{20}$-polycyclic monocarboxylic acids and $C_{24}$-polycyclic tricarboxylic acid or $C_{24}$-polycyclic polytricarboxylic anhydrides.

Diels-Alder addition of acrylic acid, methacrylic acid, fumaric acid, maleic acid or anhydride to polyunsaturated acids with conjugated double bonds yields the cyclohexene derivatives of formula I:

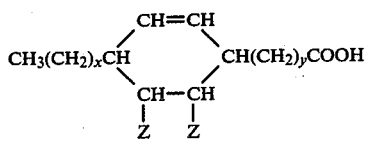
(I)

wherein x and y are integers from 3 to 9 and x and y together equal 12, at least one Z is a carboxylic acid group and any remaining Z is hydrogen. In the case of the anhydride, a five membered oxygen containing ring is attached to the cyclohexene structure (formula II):

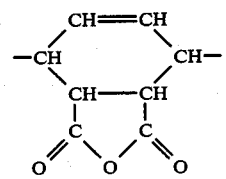
(II)

Acids and anhydrides of this type are disclosed in U.S. Pat. Nos. 3,753,968 and 3,899,476 to Ward, U.S. Pat. No. 4,081,462 to Powers et al., and British Pat. No. 1,032,363 and U.S. Pat. No. 3,412,056 both to Crawford.

"Ene"-adducts of maleic anhydride or unsaturated fatty acids, such as oleic acid, are isomeric succinic anhydride type triacids (III-A) and (III-B):

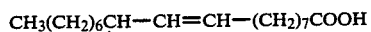
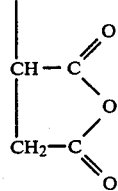
(III-A)

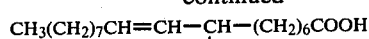
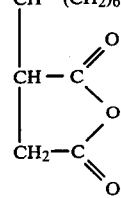
(III-B)

These adducts are disclosed in German Pat. No. 973,398 to Stein et al. and in U.S. Pat. No. 3,451,958 to Riedman et al.

Examples of the $C_{24}$-polycyclic tricarboxylic acid and anhydride are the reaction products of levopimaric acid with fumaric acid, i.e., fumaropimaric acid anhydride (IV), and the product of levopimaric acid with maleic anhydride, i.e., maleopimaric acid anhydride (V), as described in Kirk-Othmer, *Encyclopedia of Chemical Technology*, 3rd Edition, Vol. 20, Wiley-Interscience Publication, John Wiley & Sons, New York, 1978:

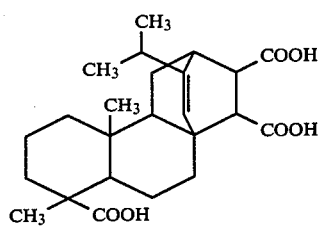
(IV)

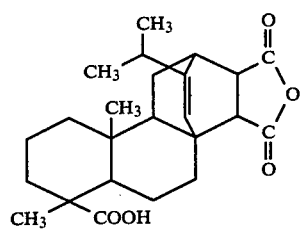
(V)

The sulfonated carboxylic acids used in the preparation of the invention emulsifier formulations are derived by sulfonation of oleic acid or tall oil fatty acids of the following compositions:

|  | Oleic Acid | Tall Oil Fatty Acid |
|---|---|---|
| Palmitic Acid | 4.29 | 2.37–5.70 |
| Palmitoleic Acid | 11.00 | 1.03–1.80 |
| Oleic Acid | 72.00 | 43.12–47.13 |
| Elaidic Acid | 1 | 1–23.50 |
| Linoleic Acid | 4.11 | 3.20–33.11 |
| Conjugated Linoleic Acid | 1.4 | 5.30–9.10 |

The sulfonated products are characterized by an acid number from about 220 to 330 and a saponification number from about 300 to 360.

Sauls and Ruggenberg disclose the sulfonation of oleic acid with sulfur trioxide in liquid sulfur dioxide in U.S. Pat. No. 2,743,288.

Pugh and Chesworth disclosure in British Pat. No. 1,278,421 the sulfonation of oleic acid with gaseous sulfur trioxide diluted with an inert gas with a continuously formed liquid film of the unsaturated fatty acid.

It is reported that upon sulfonation of oleic acid with sulfur trioxide, a mixture of 3.1:1.6:1 compounds (VI, VII and VIII) in 85% yield is obtained:

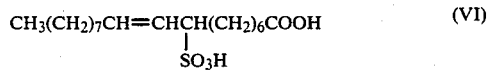

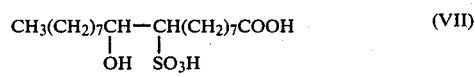

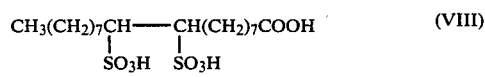

The sulfonation of tall oil fatty acid is also disclosed in the above-mentioned patents. Because of the complexity of the composition of tall oil fatty acid, no attempt to identify the sulfonated product was made.

Reaction mechanisms and all aspects of sulfonation are reviewed in E. E. Gilbert, *Sulfonation and Related Reactions,* R. E. Krieger Publishing Company, Huntington, N.Y., 1977.

The present invention relates to the preparation of rapid set high float emulsions by employing true anionic high float rapid set emulsifiers without the addition of modifiers as disclosed in U.S. Pat. No. 4,433,084, noted above.

In an initial evaluation of a tall oil fatty acid cut A, consisting of 20% palmitic acid, 15% stearic acid, 22% oleic acid, 10% palmitoleic acid, 16% iso-stearic acid, 7% linoleic acid, 2% total resin acids, 0.5% unsaponifiables, applied at a dosage from 0.4% to 1.0% based on the weight of asphalt emulsion, it was found that at least a dosage of 1% emulsifier was necessary to obtain high float emulsions passing the 1200+ sec high float test. However, at this high emulsifier level, the demulsibility is only 13% classifying this emulsion as medium set type. The reaction product of fumaric acid with tall oil fatty acid in the presence of iodine does not give asphalt emulsions with high float characteristics when applied at dosage levels ranging from 0.4 to 1.0. However, emulsions with demulsibilities between 56% and 94% are obtained. By using a combination of the tall oil fatty acid as described above and the fumaric acid modified tall oil fatty acid, emulsions are obtained which pass both the 1200+ sec float test and the 60%+ demulsibility test. Rapid setting high float emulsions also were obtained when blends of tall oil fatty acid cut A and tall oil fatty acid-acrylic acid adducts, tall oil fatty acid-maleic anhydride adducts, rosin-fumaric acid adducts and rosin-maleic anhydride adducts were applied as emulsifiers at dosage levels between 0.4% and 0.6%. In a similar fashion, other tall oil fatty acid cuts, oleic acid or tallow fatty acid in combination with their maleic anhydride adducts gives anionic rapid setting emulsions which meet rapid set high float specifications. Specific formulations are listed in the examples which follow.

The amount of emulsifier necessary to obtain emulsions which meet specifications depends on the type of asphalt. The variation in the amount of emulsifier required is caused by the variation in the amount of petroleum derived acids in the asphalt and the variations in the amount of soluble resinous maltine fractions in the asphalt. The greater the amount of resinous maltine fraction in the asphalt, the less emulsifier will be required. Within these guidelines, optimization of emulsifier dosage is merely a matter of limited experimentation.

In preparing the bituminous emulsions of this invention, an aqueous soap solution of the emulsifiers described below is intimately mixed under high shear in a colloid mill. The bitumen content can range from 30% to about 80% by weight, preferably between 60% and 70%. The dosage of the emulsifier can range from 0.1%–10% by weight of the emulsion, preferably between 0.25%–1.0% by weight of the emulsion. Dependent on the emulsifier, the emulsions are obtained in a pH range of greater than 7 to 12, with the optimum performance at a pH of about 10.5–11.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted with solvents (cutback asphalts). Practically any viscosity or penetration graded asphalt cement for use in pavement construction as described in ASTM designation D-3381 and D-946 may be emulsified with the aid of the emulsifiers of this invention.

Alkaline soaps are obtained by adding sodium hydroxide, potassium hydroxide or any other suitable base to the aqueous suspension of the emulsifier.

Thereafter, the soap solution, which is preheated to about 55° C., and the fluid asphalt, which is preheated to 120°–125° C., are mixed under high shear in a colloid mill for 30 seconds to give asphalt emulsions of brown color and creamy texture. Prior to testing according to ASTM-D-244, the emulsions are stored at 70° C. for 16 hours.

The emulsifiers for the emulsions of this invention perform very satisfactorily without auxiliary emulsifiers. However, occasionally it may be necessary to alter the performance of the emulsion to obtain improved viscosity at a given asphalt content or improved storage stability. Examples of such auxiliary emulsifiers are lignin isolated from sulfite or kraft pulping processes, sulfonic acid-containing surfactants such as alkylsulfonates, long chain alkylsulfonates and petroleum sulfonates, dimerized unsaturated fatty acids ($C_{36}$-dimer acids or $C_{54}$-trimer acids) known under the tradename EMPOL ® and VINSOL ®, a highly oxidized resinous extract from wood stumps. Nonionic emulsifiers, such as ethoxylated alkylphenols or fatty alcohols, may also be part of the emulsifier formulation.

The emulsions prepared with the emulsifiers disclosed in this invention are stable and can be stored for a long period of time until required for use.

The practice of this invention may be seen in the following examples wherein the preparation of emulsions with various types of emulsifier formulations is illustrated.

EXAMPLE 1

Table I illustrates the synergistic effect of a tall oil fatty acid cut A (mainly consisting of palmitic acid (20%), stearic acid (15%), oleic acid (22%), palmitoleic acid (10%), iso-stearic acid (16%), and 7% linoleic acid) and $C_{22}$-cyclohexene tricarboxylic acid in producing rapid and medium setting high float emulsions. The tricarboxylic acid is prepared by condensing a tall oil fatty acid mixture, consisting mainly of oleic acid and linoleic acid, with fumaric acid.

Combinations of tall oil fatty acid (A) and tall oil fatty acid-fumaric acid adduct (B) give, dependent on the relative ratio, rapid setting emulsions with high float characteristics at 0.4%–0.6% dosage and, at higher dosages (above 0.6% to 3.0%), medium setting emulsions with high float characteristics. Emulsion Nos. 3227 and 3222, 3188, and 3180 show that neither rapid setting nor high float conditions are achieved with only 10% of the fatty acid component or the fatty acid adduct component. Exxon asphalt 120/150 penetration was used for these experiments. The emulsion pH value was kept constant at 11.5.

TABLE I
PROPERTIES OF ASPHALT EMULSIONS PREPARED WITH TALL OIL FATTY ACID (A), TALL OIL FATTY ACID-FUMARIC ACID ADDUCT (B) AND BLENDS THEREOF
(Emulsions pH 11.5)

| Emulsion # | Emulsifier | Weight Ratio of B/A | % Dosage | % Asphalt | % Demuls. | Float Time (Sec.) |
|---|---|---|---|---|---|---|
| 3213 | A | | 0.4 | 68.8 | 57.2 | 790 |
| 3214 | A | | 0.5 | 68.6 | 40.6 | 708 |
| 3141 | A | | 0.5 | 66.0 | 30.6 | 339 |
| 3142 | A | | 0.6 | 66.1 | 28.5 | 383 |
| 3143 | A | | 0.7 | 66.4 | 24.3 | 358 |
| 3144 | A | | 0.8 | 65.3 | 20.2 | 390 |
| 3137 | A | | 1.0 | 66.9 | 13.2 | 1,200+ |
| 3134 | A | | 1.0 | 63.8 | 24.5 | 570 |
| 3227 | B/A | 10:90 | 0.4 | 68.5 | 59.6 | 1,160 |
| 3226 | B/A | 20:80 | 0.4 | 68.3 | 78.6 | 1,200+ * |
| 3217 | B/A | 30:70 | 0.4 | 67.5 | 67.9 | 1,200+ * |
| 3216 | B/A | 40:60 | 0.4 | 67.8 | 64.1 | 1,200+ * |
| 3215 | B/A | 50:50 | 0.4 | 67.4 | 85.2 | 1,200+ * |
| | B/A | | 0.8 | 66.8 | 35.7 | 1,200+ |
| | B/A | | 1.0 | 64.3 | 28.9 | 1,200+ |
| 3202 | B/A | 55:45 | 0.8 | 66.0 | 48.7 | 1,200+ |
| 3208 | B/A | 60:40 | 0.4 | 67.3 | 88.6 | 1,200+ * |
| 3207 | B/A | | 0.5 | 67.6 | 69.8 | 1,200+ |
| 3198 | B/A | | 0.6 | 65.8 | 59.9 | 1,200+ |
| 3203 | B/A | | 0.6 | 67.8 | 45.6 | 1,200+ |
| 3204 | B/A | | 0.7 | 67.7 | 29.4 | 1,200+ |
| 3197 | B/A | | 0.7 | 66.1 | 49.6 | 1,200+ |
| 3191 | B/A | | 0.8 | 66.4 | 51.8 | 1,200+ |
| 3183 | B/A | | 1.0 | 66.7 | 27.5 | 1,200+ |
| 3201 | B/A | 65:35 | 0.8 | 65.6 | 39.5 | 1,200+ |
| 3210 | B/A | 70:30 | 0.4 | 67.4 | 99.0 | 1,200+ * |
| 3209 | B/A | | 0.5 | 67.7 | 52.9 | 1,200+ |
| 3205 | B/A | | 0.6 | 68.2 | 41.8 | 1,200+ |
| 3206 | B/A | | 0.7 | 68.1 | 35.0 | 1,200+ |
| 3199 | B/A | | 0.7 | 65.7 | 47.8 | 1,200+ |
| 3190 | B/A | | 0.8 | 66.8 | 48.1 | 1,200+ |
| 3182 | B/A | | 1.0 | 66.1 | 38.0 | 1,200+ |
| 3211 | B/A | 80:20 | 0.4 | 67.9 | 91.8 | 818 |
| 3221 | B/A | | 0.4 | 68.4 | 96.7 | 501 |
| 3212 | B/A | | 0.5 | 68.0 | 63.6 | 1,065 |
| 3189 | B/A | | 0.8 | 65.9 | 61.2 | 1,200+ * |
| 3181 | B/A | | 1.0 | 66.9 | 38.0 | 1,200+ |
| 3222 | B/A | 90:10 | 0.4 | 67.2 | 94.9 | 473 |
| 3188 | B/A | | 0.8 | 66.8 | 57.9 | 530 |
| 3180 | B/A | | 1.0 | 66.5 | 43.8 | 571 |

TABLE I-continued
PROPERTIES OF ASPHALT EMULSIONS PREPARED WITH TALL OIL FATTY ACID (A), TALL OIL FATTY ACID-FUMARIC ACID ADDUCT (B) AND BLENDS THEREOF
(Emulsions pH 11.5)

| Emulsion # | Emulsifier | Weight Ratio of B/A | % Dosage | % Asphalt | % Demuls. | Float Time (Sec.) |
|---|---|---|---|---|---|---|
| 3186 | B | | 0.4 | 68.5 | 94.6 | 387 |
| 3187 | B | | 0.8 | 67.3 | 80.5 | 518 |
| 3223 | B | | 1.0 | 67.4 | 56.4 | 437 |

*Rapid setting high float emulsions

EXAMPLE 2

Table II shows the properties of rapid setting high float emulsions prepared with combinations of fumarized tall oil fatty acid (C) and other tall oil fatty acid cuts (D). Exxon asphalt (penetration 120/150) was used for all experiments. The emulsion pH was constant at 11.5.

TABLE II
PROPERTIES OF ASPHALT EMULSIONS PREPARED WITH BLENDS OF FUMARIZED TALL OIL FATTY ACID (C) AND VARIOUS TALL OIL FATTY ACIDS
(Emulsion pH 11.5)

| Emulsion # | Emulsifier | Weight Ratio of Components | % Dosage | % Asphalt | % Demuls. | Float Time (Sec.) |
|---|---|---|---|---|---|---|
| 3224 | C/1483[a] | 60:40 | 0.4 | 67.3 | 91.1 | 1,200+ * |
| 3220 | C/L-5[b] | 60:40 | 0.4 | 67.3 | 67.1 | 1,200+ * |
| 3218 | C/M-28B[c] | 60:40 | 0.4 | 68.1 | 58.8 | 1,200+ |
| 3220 | C/CTO[d] | 60:40 | 0.4 | 68.0 | 78.9 | 1,169 |

[a]1483: mainly consisting of oleic acid and elaidic acid
[b]L-5: mainly consisting of linoleic acid and oleic acid
[c]M-28B: mainly consisting of linoleic acid, oleic acid, and rosin (resin acids)
[d]crude tall oil
*Rapid setting high float emulsions

EXAMPLE 3

Table III shows the properties of rapid setting high float emulsions prepared with emulsifiers formulated from tall oil or tallow fatty acids and their reaction products with maleic anhydride or acrylic acid. Exxon asphalt (120/150 penetration) was used for all the experiments. The emulsion pH was kept constant at 11.5. The table also shows the achievement of a rapid setting high float emulsion formulated with emulsifiers prepared by blending fatty acids with maleinized rosin. In addition, the table shows a medium setting high float emulsion formulated with emulsifiers prepared by blending fatty acids with sulfonated fatty acids.

TABLE III
PROPERTIES OF ASPHALT EMULSIONS PREPARED WITH BLENDS OF VARIOUS TALL OIL FATTY ACIDS AND THEIR MALEIC ANHYDRIDE ADDUCTS OR THEIR ACRYLIC ACID ADDUCTS OR SULFONATE FATTY ACIDS OR ROSIN-MALEIC ANHYDRIDE ADDUCTS
(Emulsion pH 11.5)

| Emulsion # | Emulsifier | Weight Ratio of Components | % Dosage | % Asphalt | % Demuls. | Float Time (Sec.) |
|---|---|---|---|---|---|---|
| 3244 | A[a] - Maleic Anhydride Adduct | | 0.5 | 68.3 | 70.6 | 1,200+ * |
| 3261 | Crude Tall Oil - Maleic Anhydride Adduct/Crude Tall Oil | 1:5 | 0.6 | 67.1 | 88.3 | 1,200+ * |

TABLE III-continued
PROPERTIES OF ASPHALT EMULSIONS PREPARED WITH BLENDS OF VARIOUS TALL OIL FATTY ACIDS AND THEIR MALEIC ANHYDRIDE ADDUCTS OR THEIR ACRYLIC ACID ADDUCTS OR SULFONATE FATTY ACIDS OR ROSIN-MALEIC ANHYDRIDE ADDUCTS
(Emulsion pH 11.5)

| Emulsion # | Emulsifier | Weight Ratio of Components | % Dosage | % Asphalt | % Demuls. | Float Time (Sec.) |
|---|---|---|---|---|---|---|
| 3251 | L-5$^b$ - Maleic Anhydride Adduct/L-5 | 2.5:1.5 | 0.4 | 68.5 | 95.6 | 1,200 + * |
| 3307 | 1483$^c$ - Maleic Anhydride Adduct/1483 | 4:1 | 0.5 | 67.5 | 93.7 | 1,200 + * |
| 3308 | 1483$^c$ - Maleic Anhydride Adduct/A | 1:2 | 0.6 | 67.2 | 95.3 | 1,200 + * |
| 3306 | Liqrene D$^d$ - Maleic Anhydride Adduct/ Liqrene D$^c$ | 4:1 | 0.5 | 67.8 | 72.0 | 1,200 + * |
| 3256 | T-20$^e$ - Maleic Anhydride Adduct/T-20$^d$ | 1:1 | 0.4 | 69.1 | 94.2 | 1,200 + * |
| 3275 | Oleic Acid - Maleic Anhydride Adduct | | 0.4 | 66.5 | 60.5 | 1,200 + * |
| 3471 | Rosin - Maleic Anhydride Adduct/A | 1:6 | 0.525 | 65.4 | 72.7 | 1,200 + * |
| 3265 | WESTVACO DIACID ® 1550$^f$/A | 1:1 | 0.6 | 67.8 | 62.4 | 1,200 + * |
| 3299 | 1483 - Sulfonic Acid$^g$/A | 2:3 | 1.0 | 69.0 | 20.7 | 1,200 + |

$^a$Tall Oil Fatty Acid (A): mainly consisting of palmitic acid, stearic acid, palmitoleic acid, oleic acid, and iso-stearic acid
$^b$L-5: mainly consisting of linoleic acid and oleic acid
$^c$1483: mainly consisting of elaidic acid and oleic acid
$^d$Liqrene D: tall oil heads
$^e$T-20: tallow fatty acid (Proctor & Gamble)
$^f$C$_{21}$-cycloaliphatic dicarboxylic acid
$^g$1483 sulfonated with SO$_3$.
*Rapid setting high float emulsions

EXAMPLE 4

Table IV shows the dependence of emulsion properties on the pH value of the emulsion. Decreasing pH value of the soap solution results in emulsions with increased demulsibility and increased float time. Koch asphalt (penetration 150/200) was used for all experiments.

TABLE IV
EMULSION PROPERTIES IN DEPENDENCE OF THE pH VALUE OF THE EMULSIFIER SOLUTION EMULSIFIER SYSTEM: TALL OIL FATTY ACID (A) - FUMARIZED TALL OIL FATTY ACID (B)

| Emulsion # | Emulsifier | Weight Ratio of B/A | % Dosage | % Asphalt | pH Value | % Demuls. | Float Time (Sec.) |
|---|---|---|---|---|---|---|---|
| 3407 | B/A | 30:70 | 0.4 | 66.1 | 10.5 | 66.0 | 1,200 + * |
| 3408 | B/A | | 0.4 | 66.1 | 11.0 | 43.2 | 1,088 |
| 3409 | B/A | | 0.4 | 66.0 | 11.5 | 37.0 | 480 |
| 3410 | B/A | 30:70 | 0.45 | 66.0 | 10.5 | 45.2 | 1,200 + |
| 3411 | B/A | | 0.45 | 66.2 | 11.0 | 36.8 | 1,200 + |
| 3412 | B/A | | 0.45 | 66.3 | 11.5 | 35.6 | 1,200 + |
| 3413 | B/A | 40:60 | 0.4 | 65.8 | 10.5 | 86.0 | 1,200 + * |
| 3414 | B/A | | 0.4 | 66.1 | 11.0 | 63.7 | 1,200 + * |
| 3415 | B/A | | 0.4 | 66.2 | 11.5 | 51.4 | 804 |
| 3416 | B/A | 40:60 | 0.45 | 66.3 | 10.5 | 52.2 | 1,200 + |
| 3417 | B/A | | 0.45 | 66.1 | 11.0 | 45.1 | 1,200 + |
| 3418 | B/A | | 0.45 | 66.9 | 11.5 | 34.5 | 1,200 + |

*Rapid setting high float emulsion

EXAMPLE 5

Table V shows the performance of the high float emulsifier system: fumarized tall oil fatty acid (B)/tall oil fatty acid (A) with asphalts of various sources.

TABLE V

| Emulsion # | Emulsifier | Weight Ratio of B/A | Type Asphalt | % Asphalt | % Dosage | pH Value | % Demuls. | Float Time (sec.) |
|---|---|---|---|---|---|---|---|---|
| 3340 | B/A | 60:40 | Chevron, Baltimore | 66.3 | 0.4 | 11.5 | 95.2 | 1,200 + * |
| 3348 | B/A | 60:40 | Koch, Boscan | 64.5 | 0.6 | 11.5 | 86.3 | 1,200 + * |
| 3426 | B/A | 50:50 | Sunshine AC-10 | 65.1 | 0.5 | 10.5 | 75.2 | 1,200 + * |
| 3429 | B/A | 50:50 | Riffe Exxon AC-20 | 66.1 | 0.5 | 10.5 | 93.3 | 1,200 + * |
| 3428 | B/A | 50:50 | Edgington Soft Base | 66.1 | 0.5 | 10.5 | 28.9 | 243 |
| 3465 | B/A | 50:50 | Edgington Soft Base | 66.0 | 1.0 | 10.5 | 10.2 | 1,200 + |

*Rapid setting high float emulsion

From this example, it can be seen that this emulsifier system is applicable with a wide range of asphalts.

While this invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A rapid set high float aqueous bituminous emulsion comprising bitumen, water, and from about 0.4% to about 0.6%, based on the weight of the emulsion, of an anionic emulsifier comprised of an alkaline solution of a combination of (1) 20% to 80% fatty acids selected from the group consisting of tall oil fatty acids, tallow fatty acids, and mixtures thereof, and (2) 20% to 80% of a product of the reaction of the fatty acids with a member of the group consisting of acrylic acid, methacrylic acid, fumaric acid, and maleic anhydride.

2. A rapid set high float aqueous bituminous emulsion comprising bitumen, water, and from about 0.4% to about 0.6%, based on the weight of the emulsion, of an anionic emulsifier comprised of an alkaline solution of a blend of (1) 20% to 80% fatty acids selected from the group consisting of tall oil fatty acids, tallow fatty acids, and mixtures thereof, and (2) 20% to 80% of a rosin selected from the group consisting of fumarized rosin and maleinized rosin.

3. A medium set high float aqueous bituminous emulsion comprising bitumen, water, and from above 0.6% to about 3.0%, based on the weight of the emulsion, of an anionic emulsifier comprised of an alkaline solution of a combination of (1) 20% to 80% fatty acids selected from the group consisting of tall oil fatty acids, tallow fatty acids, and mixtures thereof, and (2) 20% to 80% of a product of the reaction of the fatty acids with a member of the group consisting of acrylic acid, methacrylic acid, fumaric acid, and maleic anhydride.

4. A medium set high float aqueous bituminous emulsion comprising bitumen, water, and from above 0.6% to about 3.0%, based on the weight of the emulsion, of an anionic emulsifier comprised of an alkaline solution of a blend of (1) 20% to 80% fatty acids selected from the group consisting of tall oil fatty acids, tallow fatty acids, and mixtures thereof, and (2) 20% to 80% of a rosin selected from the group consisting of fumarized rosin and maleinized rosin.

5. A medium set high float aqueous bituminous emulsion comprising bitumen, water and from above 0.6% to about 3.0%, based on the weight of the emulsion, of an anionic emulsifier comprised of a combination of 20% to 80% tall oil fatty acids and 20% to 80% sulfonated tall oil fatty acids.

6. The rapid set high float aqueous bituminous emulsion of claim 1 wherein the fatty acid reaction product is a Diels-Alder adduct of a polyunsaturated acid and a member of the group consisting of acrylic acid, methacrylic acid, fumaric acid, maleic acid, and maleic anhydride.

7. The rapid set high float aqueous bituminous emulsion of claim 1 wherein the fatty acid reaction product is an "ene"-adduct of an unsaturated acid and maleic anhydride.

8. The medium set high float aqueous bituminous emulsion of claim 4 wherein the fatty acid reaction product is a Diels-Alder adduct of a polyunsaturated acid and a member of the group consisting of acrylic acid, methacrylic acid, fumaric acid, maleic acid, and maleic anhydride.

9. The medium set high floating aqueous bituminous emulsion of claim 3 wherein the fatty acid reaction product is an "ene"-adduct of an unsaturated acid and maleic anhydride.

10. The rapid set high float aqueous bituminous emulsion of claim 1 wherein the bitumen content is from 30% to 80%, by weight of the emulsion, the emulsifier dosage is from 0.1% to 10%, by weight of the emulsion, and the emulsion pH is from greater than 7.0 to 12.0.

11. The rapid set high float aqueous bituminous emulsion of claim 10 wherein the bitumen content is between 60% and 70%, by weight of the emulsion, the emulsifier dosage is between 0.25% and 1.0%, by weight of the emulsion, and the emulsion pH is from 10.5 to 11.5.

12. The rapid set high float aqueous bituminous emulsion of claim 2 wherein the bitumen content is from 30% to 80%, by weight of the emulsion, the emulsifier dosage is from 0.1% to 10%, by weight of the emulsion, and the emulsion pH is from greater than 7.0 to 12.0.

13. The rapid set high float aqueous bituminous emulsion of claim 12 wherein the bitumen content is between 60% and 70%, by weight of the emulsion, the emulsifier dosage is between 0.25% and 1.0%, by weight of the emulsion, and the emulsion pH is from 10.5 to 11.5.

14. The rapid set high float aqueous bituminous emulsion of claim 3 wherein the bitumen content is from 30% to 80%, by weight of the emulsion, the emulsifier dosage is from 0.1% to 10%, by weight of the emulsion, and the emulsion pH is from greater than 7.0 to 12.0.

15. The rapid set high float aqueous bituminous emulsion of claim 14 wherein the bitumen content is between 60% and 70%, by weight of the emulsion, the emulsifier dosage is between 0.25% and 1.0%, by weight of the emulsion, and the emulsion pH is from 10.5 to 11.5.

16. The rapid set high float aqueous bituminous emulsion of claim 4 wherein the bitumen content is from 30% to 80%, by weight of the emulsion, the emulsifier dosage is from 0.1% to 10%, by weight of the emulsion, and the emulsion pH is from greater than 7.0 to 12.0.

17. The rapid set high float aqueous bituminous emulsion of claim 16 wherein the bitumen content is between 60% and 70%, by weight of the emulsion, the emulsifier dosage is between 0.25% and 1.0%, by weight of the emulsion, and the emulsion pH is from 10.5 to 11.5.

18. The rapid set high float aqueous bituminous emulsion of claim 5 wherein the bitumen content is from 30% to 80%, by weight of the emulsion, the emulsifier dosage is from 0.1% to 10%, by weight of the emulsion, and the emulsion pH is from greater than 7.0 to 12.0.

19. The rapid set high float aqueous bituminous emulsion of claim 18 wherein the bitumen content is between 60% and 70%, by weight of the emulsion, the emulsifier dosage is between 0.25% and 1.0%, by weight of the emulsion, and the emulsion pH is from 10.5 to 11.5.

20. The rapid set high float aqueous bituminous emulsion of claim 1 wherein the fatty acids are tall oil fatty acids comprising palmitic acid, stearic acid, oleic acid, palmitoleic acid, iso-stearic acid, and linoleic acid and the fatty acid reaction product is $C_{22}$-cyclohexene tricarboxylic acid.

* * * * *

UNITED STATES PATENT AND TRADEMARK OFFICE
CERTIFICATE OF CORRECTION

PATENT NO. : 4,676,927
DATED : June 30, 1987
INVENTOR(S) : Peter Schilling and Hans G. Schreuders It is certified that error appears in the above—identified patent and that said Letters Patent is hereby corrected as shown below:

In column 12, line 35, "claim 4" should read --claim 3--.

Signed and Sealed this

Sixteenth Day of February, 1988

Attest:

DONALD J QUIGG

Attesting Officer

Commissioner of Patents and Trademarks